United States Patent
Bhattacharjya et al.

(10) Patent No.: US 11,386,369 B2
(45) Date of Patent: Jul. 12, 2022

(54) MULTI-ATTRIBUTE EVALUATION OF NARRATIVES USING EVENT DATASETS

(71) Applicant: International Business Machines Corporation, Armonk, NY (US)

(72) Inventors: Debarun Bhattacharjya, New York, NY (US); Nicholas Mattei, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 15/850,100

(22) Filed: Dec. 21, 2017

(65) Prior Publication Data

US 2019/0197446 A1 Jun. 27, 2019

(51) Int. Cl.
| | | |
|---|---|---|
| G06N 5/02 | (2006.01) | |
| G06F 16/33 | (2019.01) | |
| G06N 7/00 | (2006.01) | |
| G06Q 10/06 | (2012.01) | |
| G06F 16/335 | (2019.01) | |
| G06N 3/04 | (2006.01) | |

(52) U.S. Cl.
CPC ..... *G06Q 10/06312* (2013.01); *G06F 16/335* (2019.01); *G06F 16/3344* (2019.01); *G06N 5/02* (2013.01); *G06N 3/0472* (2013.01); *G06N 7/005* (2013.01)

(58) Field of Classification Search
CPC .. G06Q 10/06312; G06N 5/02; G06N 3/0472; G06N 7/005
See application file for complete search history.

(56) References Cited

U.S. PATENT DOCUMENTS

| | | |
|---|---|---|
| 8,775,161 B1 | 7/2014 | Nichols et al. |
| 10,572,332 B1* | 2/2020 | Lenz ............... G06F 11/079 |
| 2003/0135445 A1* | 7/2003 | Herz ............... G06Q 40/06 |
| | | 705/37 |

(Continued)

OTHER PUBLICATIONS

Gupta, Manish, et al. "Predicting future popularity trend of events in microblogging platforms." Proceedings of the American Society for Information Science and Technology 49.1 (2012): 1-10. (Year: 2012).*

(Continued)

*Primary Examiner* — Kevin W Figueroa
(74) *Attorney, Agent, or Firm* — Stosch Sabo; Ryan, Mason & Lewis, LLP (57) ABSTRACT

Techniques for multi-attribute evaluation of narratives are provided. Inputs are obtained representing: (i) at least one historical dataset of events; (ii) a set of candidate narratives, wherein each candidate narrative is a potential future event sequence; and (iii) a query, wherein the query comprises one or more events of interest to a user. Attribute scores are computed for at least a subset of the candidate narratives based on at least a portion of the obtained input. One of the attribute scores comprises a plausibility attribute score representing a measure estimating the likelihood that a given candidate narrative will occur in the future. Another one of the attribute scores comprises a surprise attribute score representing a measure estimating how surprising a given candidate narrative will be to the user.

20 Claims, 7 Drawing Sheets

(56) References Cited

U.S. PATENT DOCUMENTS

| | | | |
|---|---|---|---|
| 2013/0041860 A1* | 2/2013 | Lawrence | G06N 20/00 706/46 |
| 2014/0095425 A1 | 4/2014 | Sipple | |
| 2015/0142505 A1 | 5/2015 | Lehto et al. | |
| 2017/0039497 A1 | 2/2017 | Guruswamappa et al. | |

OTHER PUBLICATIONS

Gunawardana, Asela, Christopher Meek, and Puyang Xu. "A model for temporal dependencies in event streams." Advances in neural information processing systems 24 (2011): 1962-1970. (Year: 2011).*

Qiao, Fengcai, et al. "Predicting social unrest events with hidden Markov models using GDELT." Discrete Dynamics in Nature and Society 2017 (2017). (Year: 2017).*

Itti, Laurent, and Pierre Baldi. "Bayesian surprise attracts human attention." Vision research 49.10 (2009): 1295-1306. (Year: 2009).*

Ray, Mrinmoy, et al. "Technology forecasting using time series intervention based trend impact analysis for wheat yield scenario in India." Technological Forecasting and Social Change 118 (2017): 128-133. (Year: 2017).*

S.P. O'Brien, "Crisis Early Warning and Decision Support: Contemporary Approaches and Thoughts on Future Research," International Studies Review, 2010, pp. 87-104, vol. 12.

P. Baldi et al., "Of Bits and Wows: A Bayesian Theory of Surprise with Applications to Attention," Neural Networks, Jun. 2010, pp. 649-666, vol. 23, No. 5.

Debarun Bhattacharjya, "Preference Models for Creative Artifacts and Systems," Proceedings of the Seventh International Conference on Computational Creativity (ICCC), Jun. 2016, pp. 52-59.

P. Bishop et al., "The Current State of Scenario Development: An Overview of Techniques," Foresight—The Journal of Future Studies, Strategic Thinking and Policy, Feb. 27, 2007, pp. 5-25, vol. 9, No. 1.

J.H. Gennari et al., "The Evolution of Protegé: An Environment for Knowledge-Based Systems Development," International Journal of Human-Computer Studies, Jan. 2003, pp. 89-123, vol. 58, No. 1.

J. Goulding et al., "Event Series Prediction via Non-Homogeneous Poisson Process Modelling," IEEE 16th International Conference on Data Mining (ICDM), Dec. 12-15, 2016, 10 pages.

C. Hashimoto et al., "Toward Future Scenario Generation: Extracting Event Causality Exploiting Semantic Relation, Context, and Association Features," Proceedings of the 52nd Annual Meeting of the Association for Computational Linguistics, Jun. 23-25, 2014, pp. 987-997.

H. Mannila et al., "Discovery of Frequent Episodes in Event Sequences," Data Mining and Knowledge Discovery, Sep. 1997, pp. 259-289, vol. 1, No. 3.

D.L. McGuinness et al., "OWL Web Ontology Language Overview," W3C Recommendation, http://www.w3.org/TR/2004/TEC-owl-features-20040210/, Feb. 10, 2004, 22 pages.

K. Radinsky et al., "Mining the Web to Predict Future Events," Proceedings of the 6th ACM International Conference on Web Search and Data Mining (WSDM), Feb. 4-8, 2013, pp. 255-264.

K. Radinsky et al., "Learning to Predict from Textual Data," Journal of Artificial Intelligence Research, Sep. 2012, pp. 641-684, vol. 45, No. 1.

K. Leetaru et al., "GDELT: Global Data on Events, Location and Tone, 1979-2012," International Studies Association (ISA) Annual Convention, Mar. 29, 2013, Version 1.0, 51 pages.

S. Sohrabl et al., "State Projection via AI Planning," Proceedings of the 31st AAAI Conference on Artificial Intelligence, 2017, pp. 4611-4617.

L.. Varshney et al., "A Big Data Approach to Computational Creativity," eprint arXiv:1311.1213, Nov. 2013, 16 pages.

R. Vilalta et al., "Predicting Rare Events in Temporal Domains," IEEE Conference on Data Mining (ICDM), Dec. 9-12, 2002, 8 pages.

G.M. Weiss et al., "Learning to Predict Rare Events in Event Sequences," Proceedings of the Fourth International Conference on Knowledge Discovery and Data Mining (KDD), Aug. 27-31, 1998, pp. 359-363.

R. Cyganiak et al., "RDF 1.1 Concepts and Abstract Syntax," W3C Recommendation, http://www.w3.org/TR/2014/REC-rdf11-concepts-20140225/, Feb. 25, 2014, 22 pages.

Pierre Wack, Scenarios: Uncharted Waters Ahead, Harvard Business Review, 1985, pp. 73-89, vol. 63, No. 5.

Ronald R. Yager, "On Ordered Weighted Averaging Aggregation Operators in Multicriteria Decisionmaking," IEEE Transactions on Systems, Man, and Cybernetics, Jan./Feb. 1988, pp. 181-190, vol. 18, No. 1.

S.P. O'Brien, "Crisis Early Warning and Decision Support: Contemporary Approaches and Thoughts on Future Research," International Studies Review, 2010, pp. 87-104, vol. 12 (Abstract only).

* cited by examiner

| NARRATIVE | PLAUSIBILITY SCORE (EXPECTED TIME FROM FIRST TO LAST EVENT) | SURPRISE SCORE (BAYESIAN SURPRISE) |
|---|---|---|
| 'extreme_heat', 'desert_storm', 'strike' | 6.5 days | 0.11 |
| 'extreme_heat', 'shutdown', 'desert_storm' | 54.5 days | 0.13 |
| 'strike', 'protest' 'shutdown' | 23 days | 0.02 |

MULTI-ATTRIBUTE EVALUATION OF NARRATIVES USING EVENT DATASETS

This invention was made with Government support under Contract No. 2013-12101100008 awarded by Defense Agency. The Government has certain rights to this invention.

FIELD

The technical field generally relates to computing environments, and more particularly to narrative evaluations in such environments.

BACKGROUND

Analysts in various domains (e.g., business, intelligence, finance) are often expected to provide a thoughtful and reasoned analysis about potential future states of the world ("future worlds") that are relevant to their practice. As an example, intelligence analysts are often required to answer key intelligence questions that require them to speculate about what may occur over a subsequent time period, from around a few months up to several years.

In the domain of intelligence analysis, there are structured analytic techniques that analysts deploy to help them with such scenario analysis (i.e., prediction problems). They are often required to use their imagination to come up with possible future worlds (i.e., scenarios). Even though humans with expertise in the subject have deep background knowledge, imagination, and intuition, they can be susceptible to cognitive biases.

SUMMARY

Illustrative embodiments comprise techniques for multi-attribute evaluation of narratives using event datasets.

For example, in one illustrative embodiment, a method comprises the following steps. Inputs are obtained representing: (i) at least one historical dataset of events; (ii) a set of candidate narratives, wherein each candidate narrative is a potential future event sequence; and (iii) a query, wherein the query comprises one or more events of interest to a user. Attribute scores are computed for at least a subset of the candidate narratives based on at least a portion of the obtained input. One of the attribute scores comprises a plausibility attribute score representing a measure estimating the likelihood that a given candidate narrative will occur in the future. Another one of the attribute scores comprises a surprise attribute score representing a measure estimating how surprising a given candidate narrative will be to the user (e.g., analyst). In additional embodiments, other attribute scores can be computed, e.g., an impact attribute score.

Advantageously, in illustrative embodiments, techniques compute quantitative and interpretable scores of narrative attributes that are of interest to an analyst (user), and display them in an interactive interface that provides rankings. The techniques allow the flexibility to discover interesting future sequences that an analyst may not have focused on otherwise, including unlikely but otherwise potentially consequential narratives.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of computer systems or processing systems comprising various combinations of physical and virtual computing resources.

An important aspect of reasoning about future events is in assessing how likely they are to occur. While there is extensive literature on how humans perform this task and on methods for improvement, illustrative embodiments realize that a potential avenue to assists humans in this endeavor is to use a computational system for increasing the scope and veracity of potential eventualities that the forecaster could imagine and consider. The number of future worlds that are possible is combinatorial in the number of variables that the analyst identifies as being of interest. Hence, there is a need for a system to help the analyst evaluate and reason about this exponential space of possibilities. Illustrative embodiments provide a multi-attribute evaluation system configured to provide the analyst with these and other advantages.

Figure 1:
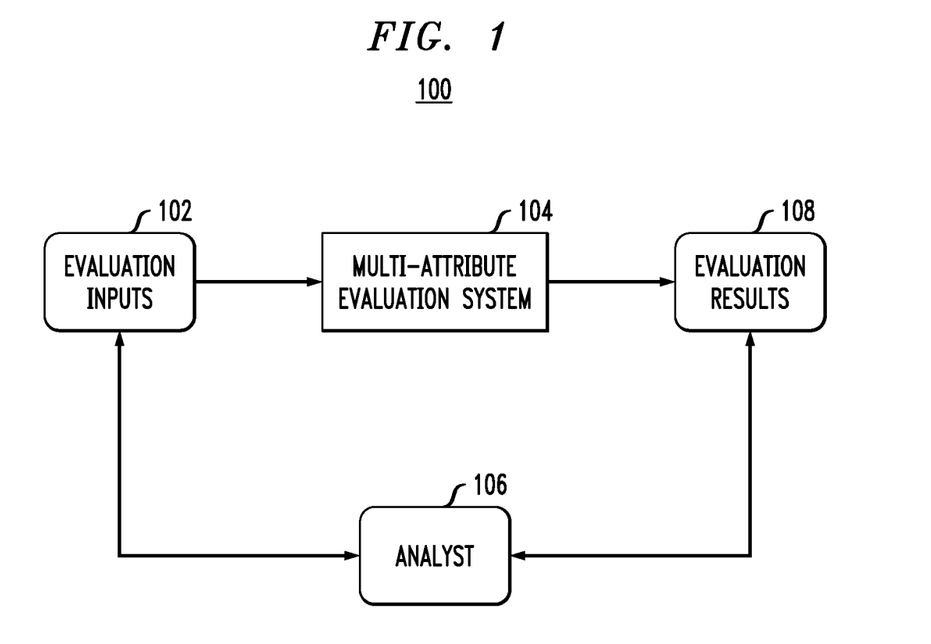
FIG. 1 depicts a block diagram illustrating a multi-attribute evaluation system environment, according to an illustrative embodiment.

FIG. 1 depicts a block diagram illustrating a multi-attribute evaluation system environment 100, according to an illustrative embodiment. As generally shown, a set of evaluation inputs 102 are presented to a multi-attribute evaluation system 104. The evaluation inputs 102 comprise various types of information (e.g., narratives, historical event datasets, analyst profile, knowledge database, etc.) as will be further described in detail below. In addition, the input information comprises a query from an analyst 106 (e.g., "What is the forecast for social unrest in Country A in the next 3 years?"). In response to the evaluation inputs 102, the multi-attribute evaluation system 104 computes a set of attribute scores. The attribute scores are aggregated to generate evaluation results 108 that represent a response to the analyst query. Examples of attributes that are scored in accordance with illustrative embodiments comprise a plausibility attribute, a surprise attribute, an impact attribute, as well as other attributes. These attributes will be further explained below. The evaluation results 108 are presented to the analyst 106 and/or one or more other individuals, systems, etc. Depending on the nature of the query and/or the results 108, one or more additional queries can be presented to the system 104 which then iteratively updates the results 108.

Figure 2A:
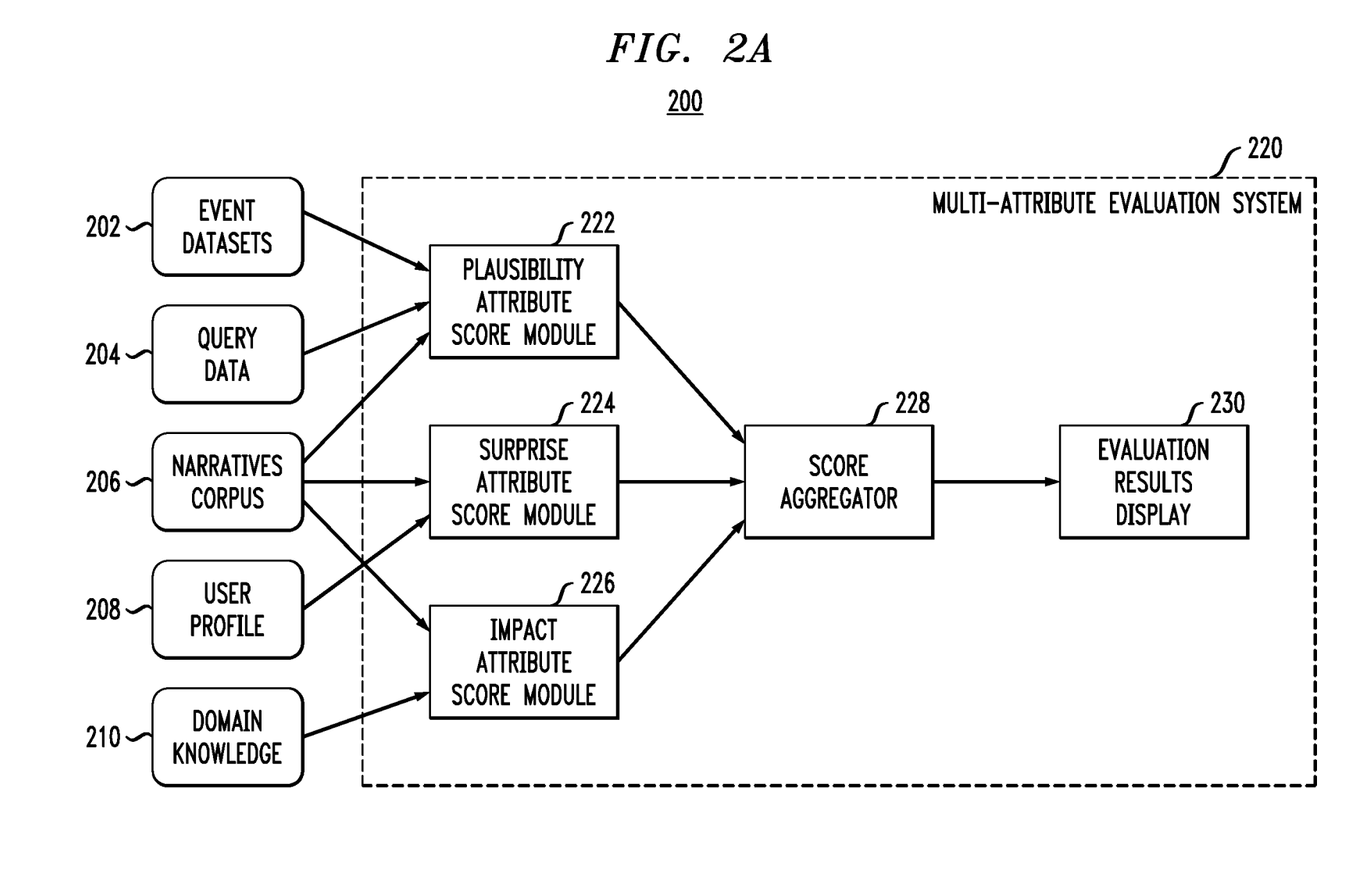
FIG. 2A depicts a block diagram illustrating a more detailed view of a multi-attribute evaluation system, according to an illustrative embodiment.
Figure 2B:
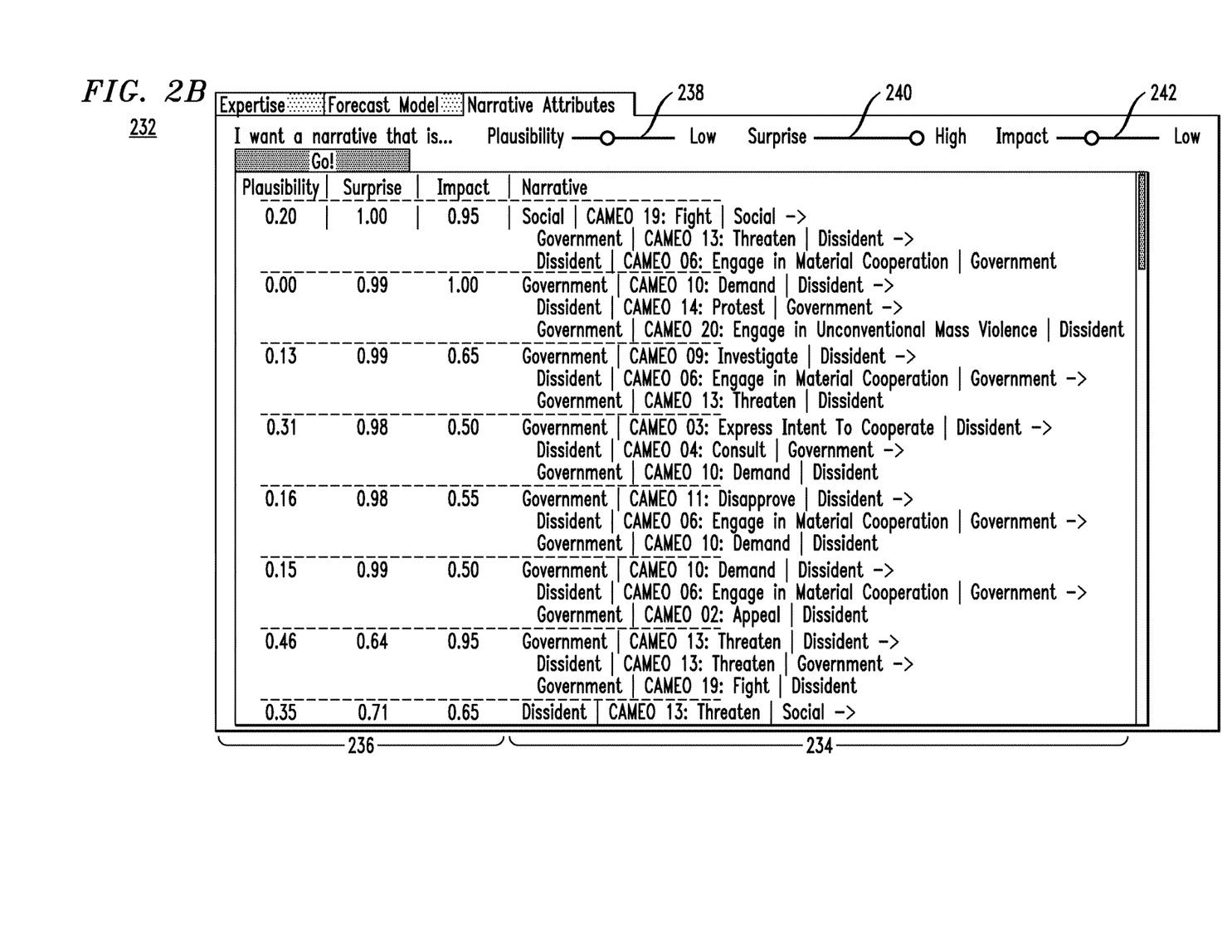
FIG. 2B depicts an interactive interface associated with a multi-attribute evaluation system, according to an illustrative embodiment.

FIGS. 2A and 2B depict a block diagram illustrating a more detailed view of a multi-attribute evaluation system environment 200, according to an illustrative embodiment. It is to be appreciated that the multi-attribute evaluation system environment 200 may represent one illustrative implementation of the multi-attribute evaluation system environment 100 in FIG. 1. Other implementations are contemplated in alternative embodiments.

As shown in FIG. 2A, evaluation inputs (102 in FIG. 1) comprise event datasets 202, query data 204, narratives corpus 206, user profile 208, and domain knowledge 210. The evaluation inputs are presented, as shown, to a set of attribute score modules in multi-attribute evaluation system 220 (104 in FIG. 1). The set of attribute score modules comprise a plausibility attribute score module 222, a surprise attribute score module 224, and an impact attribute score module 226. One or more other attribute score modules (not expressly shown) can be included in alternative embodiments. More particularly, as shown: event datasets 202, query data 204, and narratives corpus 206 are provided as inputs to the plausibility attribute score module 222; narratives corpus 206 and user profile 208 are provided as input to the surprise attribute score module 224; and narratives corpus 206 and domain knowledge 210 are provided as input to the impact attribute score module 226.

As will be further explained below, each of the set of attribute score modules 222, 224, and 226 computes a score, and the scores are aggregated by score aggregator 228. The score aggregator 228 generates the evaluation results (108 in FIG. 1) that are presented to an analyst (106 in FIG. 1) in accordance with evaluation results display 230. An example presentation 232 that is displayed on display 230 is shown in FIG. 2B. The presentation 232 will be further described below.

More particularly, the multi-attribute evaluation system 220 facilitates an analyst's creative process around imagining potential future event sequences, also known as "narratives." As mentioned above, the system 220 takes as input event datasets 202 that constitute a database of historical events, narrative corpus 206 which contains a (possibly large) set of candidate narratives, information about the analyst which is referred to as user profile 208, and query data 204 with contextual information as pertains to the analyst's query of interest. The system 220 evaluates the candidate set of narratives along a set of attributes and displays a subsequent ranking of the narratives in an interactive manner (e.g., 232) to the analyst/user. The system 220 uses data-driven algorithms for generating scores along the set of attributes, which include plausibility (module 222) and surprise (module 224). The system 220 can also consider domain-specific attributes that rely on further knowledge about events (domain knowledge 210). For instance, the system 220 can also evaluate the attribute of impact (module 226) in the case of a political event dataset such as Global Database of Events, Language, and Tone (GDELT) and the Integrated Crisis Early Warning System (ICEWS). Finally, the system 220 aggregates (228) all the pertinent scores into a ranking using functions from social choice theory and provides an interactive environment (232) for the user to explore and re-rank the narratives.

Given the illustrative system configuration shown in FIG. 2A, illustrative embodiments address the problem of scoring and ranking a set of potential future narratives, i.e., event sequences, and comprises the following steps. A set of historical events, i.e., event database (event datasets 202), are inputted to the system 220. The event database is a corpus of past events including their times. It is assumed that events can be categorized into one of a set of event tokens. The dataset may optionally also include metadata such as location. Further, the user profile (208) is inputted to the system 220. The user profile (possibly empty) is a set of events that represents the expertise of the analyst. Still further, the query data (204) is inputted to the system 220. The query data minimally contains a subset of event tokens of interest, but may also include other contextual information such as location of the prediction question when such metadata is available in the event dataset. Optionally, a formalized body of knowledge (210), e.g., a knowledge graph, an ontology, and/or a taxonomy, is inputted to the system 220. The body of knowledge encodes expert domain knowledge such as the relations between events, their impact and severity, and possibly other information.

The narrative corpus 206 is inputted to the system 220 and comprises a (possibly large) set of candidate narratives. This set of candidate narratives could be provided by the analyst or any other source such as a domain-specific generating system. The input narratives are analyzed in conjunction with the analyst's expertise to produce an estimate of how surprising (surprise attribute score module 224) the analyst may find each narrative. Further, the input narratives are analyzed in conjunction with both the history of events in the specified location and the forecasting time period to produce an estimate of the plausibility (plausibility attribute score module 224) of each narrative. This can be done using stochastic event analysis. Optionally, the input narratives are analyzed in conjunction with the history of events and the formalized body of knowledge to estimate domain-specific attributes such as the impact (impact attribute score module 226) of each narrative.

The scores are aggregated (score aggregator 228) over the set of narratives to produce a ranked list over all narratives that reflects a tradeoff between the metrics. The ranked list is displayed (display 230) to the analyst in the context of an interactive interface (232). The interactive interface allows the analyst to modify the set of inputs (202-210) as well as the aggregation method which could cause the display to be updated. In the example shown in FIG. 2A, a set of candidate narratives 234 produce a set of scores 236 (including a plausibility score, a surprise score, and an impact score). The analyst is given interactive control by display sliders 238, 240 and 242 as depicted in FIG. 2B to set the respective level (high to low or low to high) for the plausibility attribute, the surprise attribute, and the impact attribute.

As mentioned, a main input source for system 220 is a database of historical event datasets 202, which is utilized for computing attribute scores for narratives. In one example, the event database is comprised of a large corpus of global events available on the Internet. The two largest political event datasets are the above-mentioned GDELT dataset and the ICEWS dataset. These political events are of the form: Actor1→Action→Actor2, i.e., who does what to whom along with when and where. In both ICEWS and GDELT, this is referred to as the source actor performing an action on the target actor. The actors and actions are Conflict and Mediation Event Observations (CAMEO) coded which is a specific ontology suitable for events involving domestic and international actors. There are 20 high-level actions and 310 low-level actions in the coding. Actors also belong to an ontology; ICEWs and GDELT differ slightly on the specifics around this actor ontology. The system 220 is configured to manage the different ontologies.

While system 220 is general enough to handle a large variety of historical event datasets, it is even more powerful when it can compute scores for domain-specific attributes that are of particular interest to the analyst. This can be achieved if system 220 is provided with additional knowledge (210) about events. Such background knowledge can take many forms. One common form is the Web Ontology Language (also referred to as OWL) which is used for establishing entities, relationships, and properties. Formalizing knowledge in this way helps systems interchange, update, modify and store relationships. A common tool for creating, editing and working with ontologies created in OWL is the Protégé framework.

The Resource Description Framework (RDF) is another formalization of knowledge that underlies Wikipedia and many other online, semantically linked data sources. System 220 is configured to take advantage of knowledge formalized and stored in one or more of these formalisms to compute scores for domain-specific attributes. Recall that impact attribute score module 226 performs this particular attribute score.

Further, system 220 is intended to help analysts with idea generation while thinking about future narratives and any associated analysis and planning. The system goes beyond predicting the future, attempting to also shine light on implausible but important narratives. The system provides many advantages, by way of example only:

(i) The system uses a structured event dataset as input, which may or may not be created from unstructured data sources such as news. This enables the system to build quantitative and interpretable scores of narrative attributes that are of interest to the analyst, and display them with an interactive front end that provides rankings.

(ii) The system involves multiple attributes (plausibility, surprise, and possibly impact) and is interactive. In combination, this allows the flexibility to discover interesting future sequences that an analyst may not have focused on otherwise, including unlikely but otherwise potentially consequential narratives. This is aligned with the perspective that the system is helping in the discovery of "creative narratives," where creative is viewed through a multi-attribute lens.

Figure 3A:
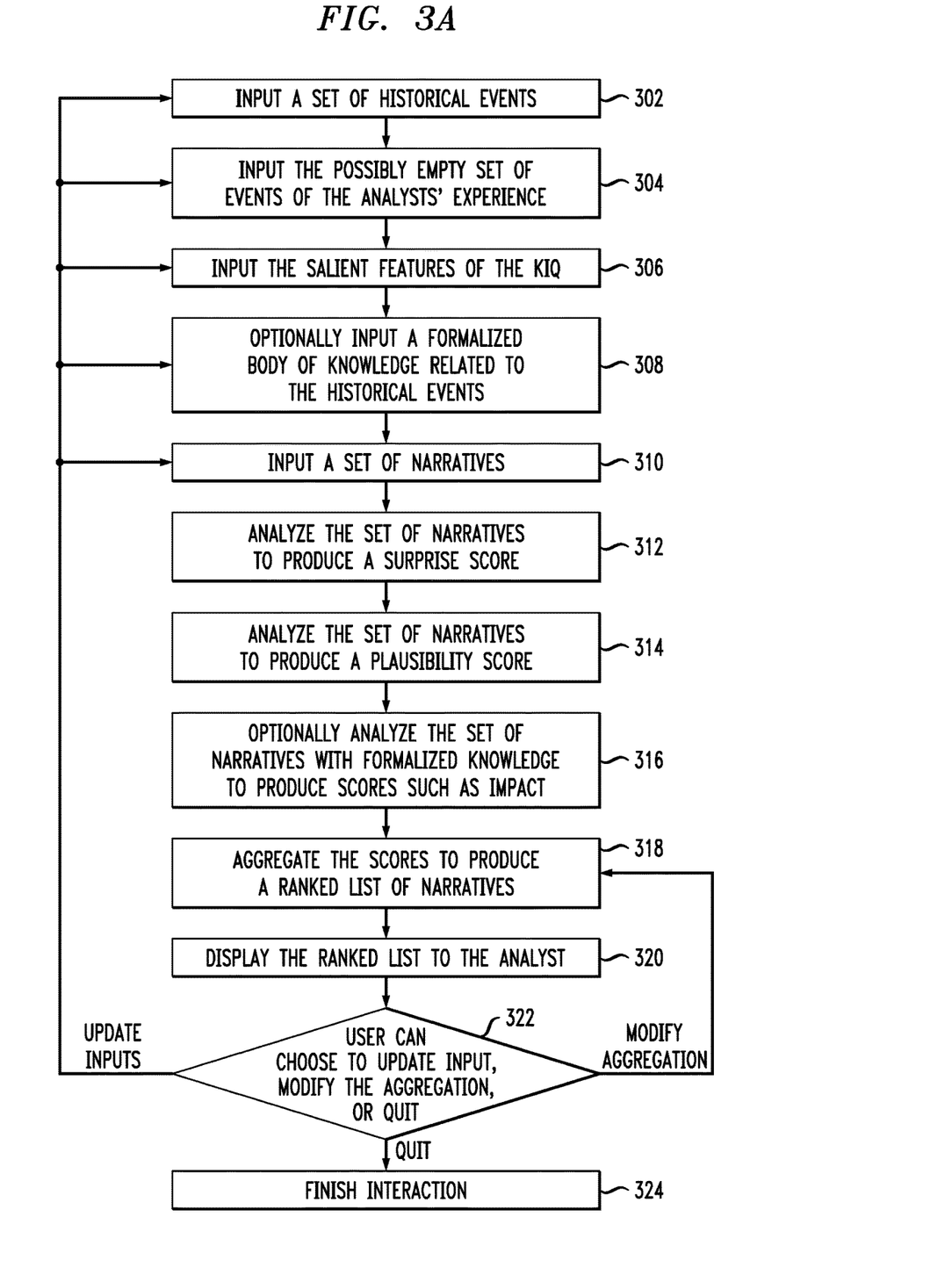
FIG. 3A depicts a flow diagram illustrating a multi-attribute evaluation methodology, according to an illustrative embodiment.

FIG. 3A depicts a flow diagram illustrating a multi-attribute evaluation methodology 300, according to an illustrative embodiment. That is, FIG. 3A depicts an illustrative set of steps that implement the above-mentioned process flow.

Step 302: Input a set of historical events, i.e., event database, which is a corpus of past events and their times.

This input can come from any number of sources, such as a database connected to a networked system, a comma-separated value (csv) file or data file passed directly into the system, or as an in a memory data structure of the event format described below.

Step 304: Input a possibly empty set of events that represent the analyst's expertise.

This input can come from any number of sources, such as an interactive user interface where the analyst inputs the events directly, and/or where the user can specify time periods (and optionally locations) and the system extracts the relevant events from the connected event database from Step 302.

Step 306: Input the query data that minimally contains a subset of event tokens of interest, but could also include other contextual information like location.

This input can either come from another system which has extracted the minimal set of parameters from a natural language query, another system or database which contains a set of salient parameters that the user can select, and/or the user could input the query directly into the user interface (e.g., 232 in FIG. 232).

Step 308: Optionally inputting a formalized body of knowledge, e.g., a knowledge graph, which encodes expert domain knowledge including relations between events, their impact and severity, and possibly other information.

The formalized body of knowledge can take a number of illustrative forms: it can be expressed as entity, relation, entity triples, i.e., RDF triples; it can be a formal ontology modeled and stored in some formal language such as the Web Ontology Language (OWL).

This formalized body of knowledge can either be stored on a separate system and extracted at runtime from a database or it can be passed into the system in a suitable data structure.

Step 310: Inputting either from the analyst or from another system which generates them a set of candidate narratives.

This input can come from any number of sources, such as another system which automatically generates candidate narratives, a database of pre-computed or pre-constructed narratives, and/or by the analyst who builds a narrative list real-time by selecting potential sequences of events from the set of possible event tokens.

Step 312: Analyzing the input narratives in conjunction with the analyst's expertise to produce an estimate of how surprising the analyst would find each narrative.

The analysis of the surprise can be performed using the Bayesian surprise notion as illustratively described below.

Step 314: Analyzing the input narratives in conjunction with both the history of events in the specified location and the forecasting time period to produce an estimate of the plausibility of each narrative.

The analysis can be performed using either the Superposition of Independent Poisson Processes or the Continuous Time Markov Process as illustratively described below.

Step 316: Optionally, analyzing the input narratives in conjunction with the history of events and the formalized body of knowledge to score domain-specific.

In one embodiment, an impact score is computed for each narrative. Thus, each possible event is mapped to one or more values which indicate the severity or intensity of the event, e.g., number of people affected, amount of lost money, etc., in the formalized body of knowledge.

Given the above mapping to a notion of impact, the impact for a narrative can be computed using some mathematical aggregation function, e.g., sum, average, max, or some other more complex function such as an order weighted average (OWA), to aggregate the impacts for each event.

Step 318: Aggregating these scores over the set of narratives to produce a ranked list over all narratives that reflects a tradeoff between the metrics.

One method for aggregation is to normalize the scores to the range 0-1 and then apply a scoring function with weights defined by the user, using Borda or other social choice inspired scores; and/or using a more complex function such as an order weighted average (OWA), to create composite scores for each narrative. The output ranking is then the scored ranking.

Another method for aggregation is to view each analysis as a voter in a larger process and using methods from social choice theory, e.g., Kemeny aggregation, to find the output list that is most strongly supported by the voters.

Step 320: Displaying the ranked list to the analyst.

This display can be in a list or visual form with representations of the events in the narrative or with simply the text of the events.

Step 322: Provide an interactive interface. One embodiment of an interactive interface is depicted in 232 of FIG. 2B. The interface allows:

(i) The analyst to return to any of Steps 302, 304, 306, 308 and 310 to refine or update the set of inputs to the system.

(ii) The analyst to return to Step 318 to modify the aggregation procedure.

(iii) The analyst to go to Step 324 to end the interactive session.

Given the above illustrative system configurations and methodologies described above, illustrative embodiments for computing the narrative attributes will now be explained. It is to be understood that the computations below are intended to be examples of techniques for computing the narrative attributes and, thus, alternative computational techniques may be employed.

More particularly, presented below are details about models for computing plausibility and surprise attributes for narratives. Notation used in the illustrative explanations is as follows.

An event dataset is a temporally ordered sequence of events including time stamps, $D=\{d_i\}$, $i=1, \ldots, N$, where each event $d_i$ is a tuple $d_i=(e_i,t_i)$. $e_i$ is the event token, assumed to belong to some alphabet $\varepsilon$ with cardinality M, and $t_i$ is the time of occurrence. e and e' refer to arbitrary event tokens from $\varepsilon$.

A narrative is a sequence of events, denoted $[e_1,e_2, \ldots, e_K]$. Note that we are interested in narratives in the future, therefore the times of event occurrence are unknown and modeled as random variables. Given such illustrative notation, a plausibility attribute score (subsection I) and a surprise attribute score (subsection II) will now be described according to illustrative embodiments.

I. Plausibility

An analyst is often interested in plausibility of narratives, i.e., what can the system say about the potential occurrence of a narrative in the future? One approach to gauging a narrative's plausibility is through models involving the time taken for the narrative to occur. For example, for the narrative $[e_1,e_2,e_3]$, how much time does it take from the first occurrence of $e_1$ to the first occurrence of $e_2$ to the first occurrence of $e_3$?

There are two potential easily interpretable measures of plausibility pertaining to the probability distribution of the time:

1. What is the expected time for the narrative to occur?
2. What is the probability it will occur within a certain forecasting time period, such as a year?

Models that compute expected time for measuring plausibility are described below, however, it is straightforward to also deploy the models for computing the probability of occurrence. For instance, the distribution of the time for the narrative to occur could be assumed to be a Normal distribution. Thus, expected times are described and $\bar{t}(e, e')$ is used to denote the expected time from some event token e to e'. Note that a higher expected time indicates lower plausibility.

In one illustrative embodiment, it is assumed that inter-arrival times between pairs of events do not depend on occurrences of other events, in which case, the uncertain time for a narrative can be written by summing over the pairwise inter-arrival times:

$$T([e_1, e_K]) = \sum_{k=1}^{K-1} t(e_k, e_{k+1}).$$

Since the expected value of a sum of random variables is the sum of expected values:

$$E[T([e_1, \ldots, e_K])] = \sum_{k=1}^{K-1} \bar{t}(e_k, e_{k+1}).$$

Therefore, the computation of plausibility is decomposed into finding inter-arrival times $\bar{t}(e,e')$ for all relevant pairs of events e and e'. In the remainder of this section, we describe two potential models for computing these expected inter-arrival times.

(a) Superposition of Independent Poisson Processes

According to this underlying process, each event token e occurs according to an independent Poisson process with rate $\lambda_e$. The dataset is a superposition of these independent processes, one for each event token. This model clearly makes significant independence assumptions.

(i) Parameter Estimation

The rate for each e can be estimated separately as the processes are independent. Since the time between any two events of the same token is exponential, the maximum likelihood estimates for the rates are:

$$\hat{\lambda}_e = \frac{N_e}{T}, \forall e \in \varepsilon,$$

where $N_e$ is the number of events with token e in the dataset.

(ii) Expected Inter-Arrival Time

Given that an event with token e occurs, the time until an event with token e' occurs is exponentially distributed with rate $\hat{\lambda}_{e'}$, therefore:

$$\bar{t}(e, e') = \frac{1}{\hat{\lambda}_{e'}}, \forall e, e' \in \varepsilon.$$

(b) Continuous Time Markov Process

An alternate model corresponds to a continuous time homogeneous Markov process. For this model, it is more convenient to refer to event tokens using their indices (according to some predetermined order), for instance, i,j, $k \in \{1, \ldots, M\}$. For ease of exposition, there will be no distinguishing between an event token and its index.

According to this Markov process, the time until the next event occurrence is exponentially distributed with rate $q_i$, given that the most recent event token is i. The event token at the next transition is j with probability $\theta_{ij}$. Note that self-transitions are possible in our formulation, i.e., j=i is possible.

(i) Parameter Estimation

Let N[i,j] denote the number of transitions from i to j, and N[i] the number of transitions that start from i, therefore $N[i]=\Sigma_j N[i,j]$ is the time spent in transitions that begin with i, then the maximum likelihood estimates for model parameters q and θ are:

$$\hat{q} = \frac{N[i]}{T[i]}; \hat{\theta}_{ij} = \frac{N[i,j]}{N[i]} \forall i, j.$$

(ii) Expected Inter-Arrival Time

Let $\bar{t}_{ij}$ be the expected time from event token i to j. The assumptions of the stochastic process imply the following linear system of equations:

$$\bar{t}_{ij} = \left[\frac{1}{\hat{q}_i} + \sum_{k \neq j} \hat{\theta}_{ik} \bar{t}_{kj}\right] \forall i, j.$$

If $\bar{T}=\{\bar{t}_{ij}\}$, denotes the matrix of inter-arrival times, note that independent equations can be written for every column of this matrix. For any given j, we two types of equations are formulated. For i=j, the terms can be re-arranged as follows:

$$\bar{t}_{ii} - \sum_{k \neq i} \hat{\theta}_{ik} \bar{t}_{ki} = \frac{1}{\hat{q}_i}.$$

For all i≠j, the linear equations can be written as:

$$0 * \bar{t}_{ii} + (1 - \hat{\theta}_{ii})\bar{t}_{ij} - \sum_{k \neq i, k \neq j} \hat{\theta}_{ik} \bar{t}_{ki} = \frac{1}{\hat{q}_i}.$$

The $j^{th}$ column of the inter-arrival time matrix, denoted $\bar{T}*j$, can be written using matrices as:

$$\bar{T}*j = A_j^{-1} b,$$

where $$b = \left[\frac{1}{\hat{q}_1}, \ldots, \frac{1}{\hat{q}_M}\right]^T$$

and the matrix $A_j$ is constructed such that its $j^{th}$ column is the unit vector $e_j$, diagonal elements are $1-\hat{\theta}_{ii}$ (except for i=j, which is 1), and every other element in the $i^{th}$ row and $k^{th}$ column is $-\hat{\theta}_{ik}$. The inter-arrival times can therefore be obtained by solving M sets of equations, each involving inverting a matrix of size M by M.

II. Surprise

In one illustrative embodiment, surprise of a narrative (or in general, any set of events) is measured using Bayesian surprise, which captures the effect that a piece of information has on the observer by transforming their prior beliefs to posterior beliefs through Bayes' rule.

Since system 220 uses an event dataset 202 as input, a formulation that models an analyst's beliefs about events can be employed. In one illustrative embodiment, an analyst's prior beliefs are assumed to be approximated by a distribution of the event tokens that the analyst has experienced in the analyst's regions and time periods of expertise (e.g., last five years in Country B and the previous two years in all Region A's countries except Country C). This approach uses a set of relevant events in the dataset to approximately represent an analyst's experience and expertise.

When a new narrative is seen, an analyst's posterior beliefs are captured by also including the event counts from this narrative. Formally, Bayesian surprise is a distance or dissimilarity metric between an analyst's prior and posterior beliefs. Using KL-divergence as the metric, for an analyst whose beliefs about event histories pertaining to their expertise are referred to as B, the analyst's surprise for a narrative $\mathcal{N} = [e_1, \ldots, e_K]$ can be scored as $$S(\mathcal{N}, \mathcal{B}) = \int_{\mathcal{B}} P_{\mathcal{B}} \log\left(\frac{P_{\mathcal{B}}}{P_{\mathcal{B}|\mathcal{N}}}\right) d\mathcal{B}$$

for prior beliefs $P_{\mathcal{B}}$ and posterior beliefs $P_{\mathcal{B}|\mathcal{N}}$.

An illustrative use case will now be described. Risk analysis is the example application, although embodiments are not limited to such an application. Consider a risk analyst who is now in charge of scenario planning associated with an oil field in Country A with previous experience in Country B. Assume the analyst is thinking about potential future event sequences pertaining to above-the-ground matters that could negatively impact production. These sorts of risks are known as non-technical risks (NTRs) in the oil and gas industry. Further, assume the following input data.

Query Data: It is assumed the analyst is using the system 220 to help provide potentially interesting future narratives in Country A. Also, suppose the analysts cares about the following five event tokens/categories:
1. 'desert storm'
2. 'extreme heat'
3. 'strike'
4. 'shutdown'
5. 'protest'

Database of Events: Assume the database consists of a temporal sequence of events at two locations: Country A and Country B. These datasets have time-stamped events in the format: {time (day): [list of event tokens]}

Country A Event Dataset: {0:['extreme_heat'], 2:['extreme_heat', 'desert_storm'], 5:['strike'], 6:['shutdown'], 20:['protest'], 22:['strike'], 35:['extreme_heat'], 40:['desert_storm']}

Country B Event Dataset: {0:['strike'], 4:['protest'], 7:['strike'], 10:['shutdown'], 20:['protest'], 22:['strike'], 25:['protest'], 27:['protest'], 30:['extreme_heat']}

Narrative corpus: The analyst is interested in the following three narratives, each of length three:
1. 'extreme_heat', 'desert_storm', 'strike'
2. 'extreme_heat', 'shutdown', 'desert_storm'
3. 'strike', 'protest', 'shutdown'

User Profile: The analyst has prior experience in Country B, and is associated with the Country B event dataset.

Figure 3B:
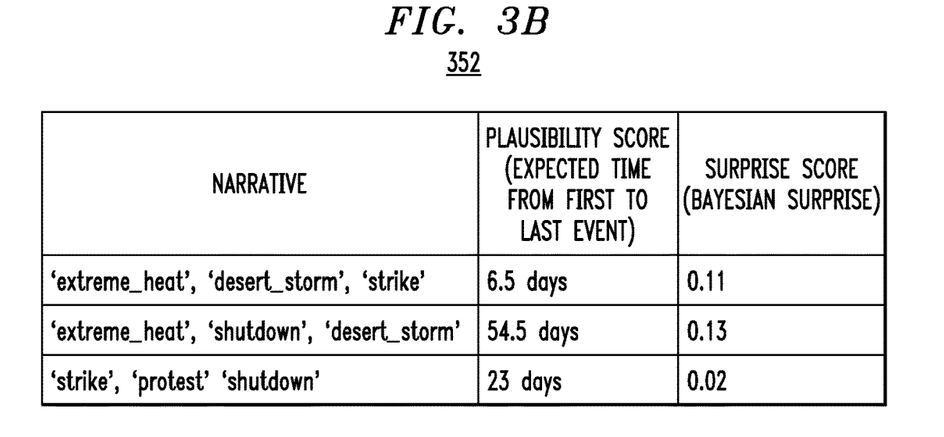
FIG. 3B depicts evaluation display results associated with a given use case, according to an illustrative embodiment.

Following computation of a plausibility score and a surprise score, as illustratively explained above, an example tabular output 352 is shown in FIG. 3B.

Accordingly, the system 220 computes scores along multiple attributes, in this use case, only plausibility and surprise, as shown in the table 352. Note that scores are not aggregated here as this is a simple illustrative example.

Note that the first narrative (first row of table 352) is quite plausible, occurring in about a week on average, mainly because the model indicates that extreme heat is quickly followed by a desert storm in Country A. Note that the plausibility metric takes the context (Country A) into account.

The first two narratives in the table (first two rows in table 352) are deemed more surprising because extreme heat and desert storms are rare in Country B, which is what the risk analyst has been previously exposed to.

In this simple example, the first event is deemed most plausible but also quite surprising.

Figure 4:
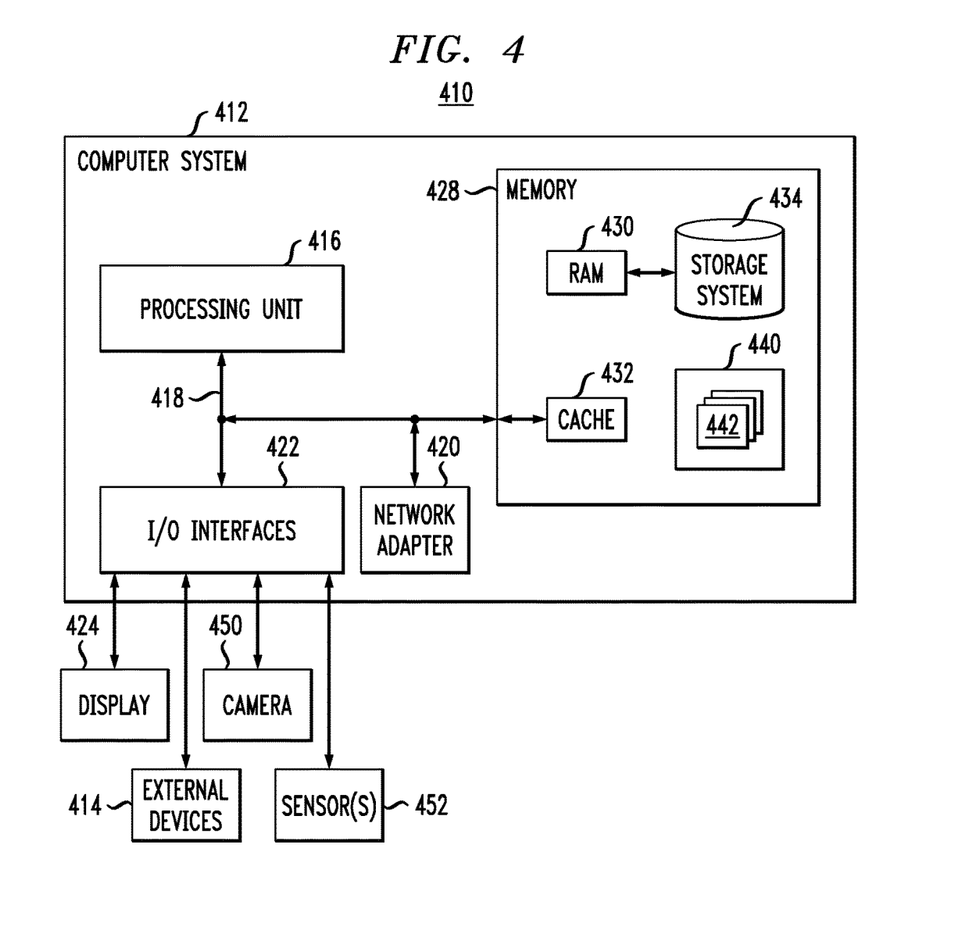
FIG. 4 depicts a computer system in accordance with which one or more components/steps of techniques of the invention may be implemented, according to an illustrative embodiment.

One or more embodiments can make use of software running on a computer or workstation. With reference to FIG. 4, in a computing node 410 there is a system/server 412, which is operational with numerous other general purpose or special purpose computing system environments or configurations. Examples of well-known computing systems, environments, and/or configurations that may be suitable for use with system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

System/server 412 may be described in the general context of computer system executable instructions, such as program modules, being executed by a computer system. Generally, program modules may include routines, programs, objects, components, logic, data structures, and so on that perform particular tasks or implement particular abstract data types. System/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, system/server 412 is shown in the form of a computing device. The components of system/server 412 may include, but are not limited to, one or more processors or processing units 416, system memory 428, and bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 412 typically includes a variety of computer system readable media. Such media may be any available media that is accessible by system/server 412, and it includes both volatile and non-volatile media, removable and non-removable media.

The system memory 428 can include computer system readable media in the form of volatile memory, such as random access memory (RAM) 430 and/or cache memory 432. System/server 412 may further include other removable/non-removable, volatile/nonvolatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces.

As depicted and described herein, memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

System/server 412 may also communicate with one or more external devices 414 such as a keyboard, a pointing device, an external data storage device (e.g., a USB drive), display 424, camera 450, sensor(s) 452, one or more devices that enable a user to interact with system/server 412, and/or any devices (e.g., network card, modem, etc.) that enable system/server 412 to communicate with one or more other computing devices. In one embodiment, camera 450 is configured to capture an image of one or more bidders from an auction, and generate a list of the one or more bidders by processing the image. In one embodiment, sensor(s) 452 are configured to obtain data associated with the auction. For example, sensor(s) 452 may be configured to obtain physiological data and current weather, as described with reference to FIG. 2. Such communication can occur via I/O interfaces 422. Still yet, system/server 412 can communicate with one or more networks such as a LAN, a general WAN, and/or a public network (e.g., the Internet) via network adapter 420. As depicted, network adapter 420 communicates with the other components of system/server 412 via bus 418. It should be understood that although not shown, other hardware and/or software components could be used in conjunction with system/server 412. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
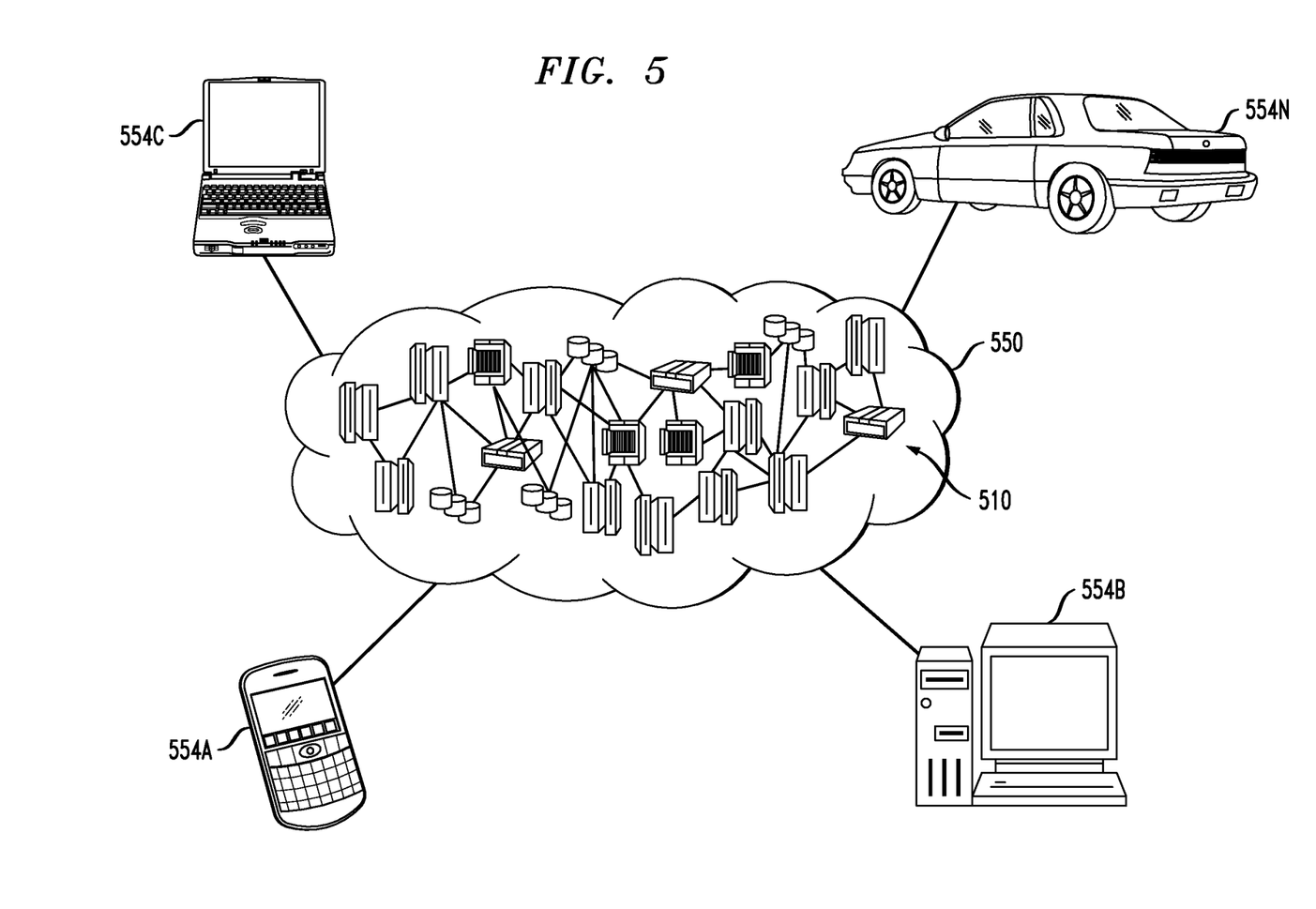
FIG. 5 depicts a cloud computing environment, according to an illustrative embodiment.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
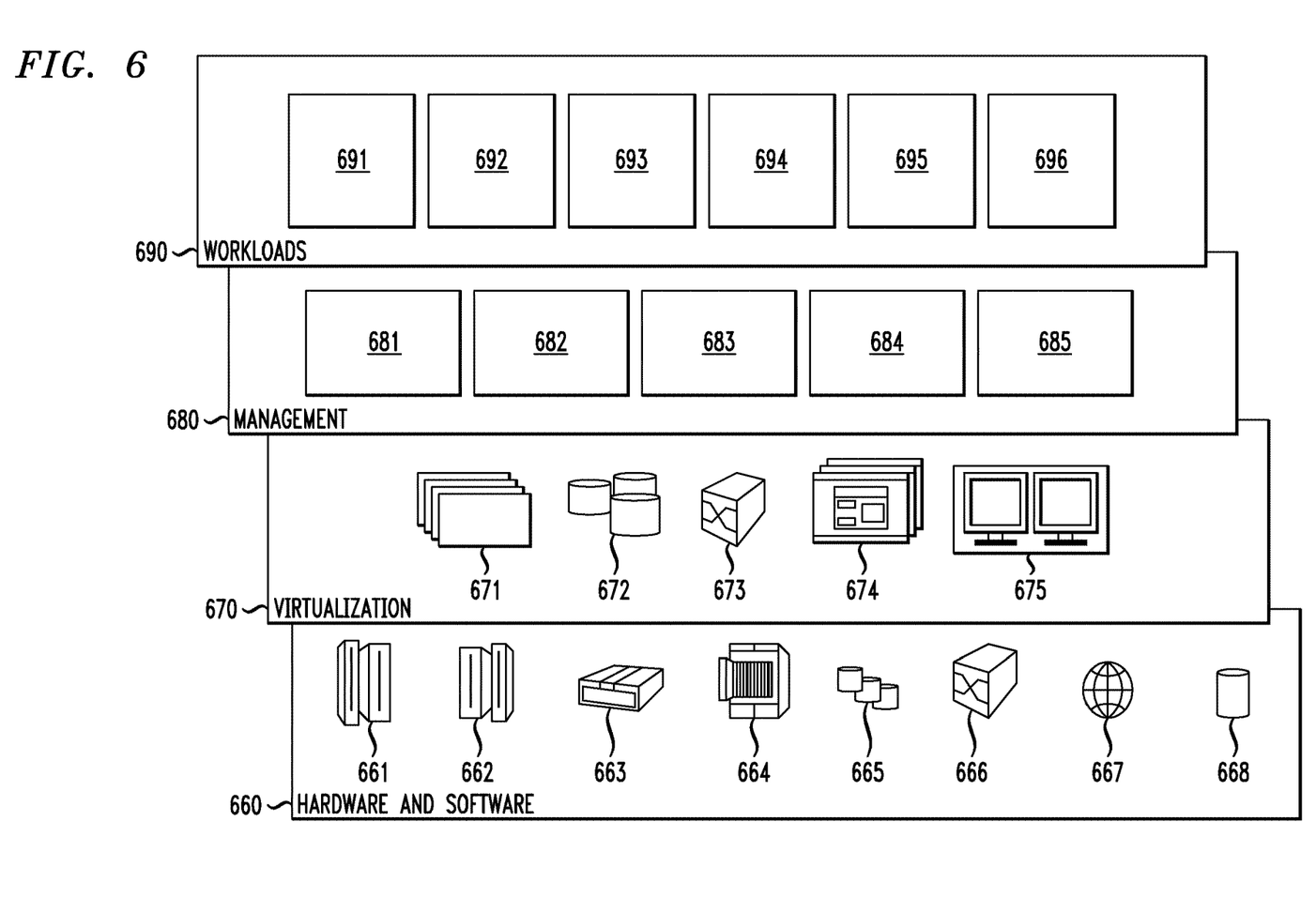
FIG. 6 depicts abstraction model layers, according to an illustrative embodiment.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and vicinity based cognitive bidding support 696, which may perform various functions described above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system comprising:
one or more memory devices; and
one or more processor devices operatively coupled to the one or more memory devices and configured to execute steps comprising:
obtaining input representing at least one historical dataset of events;
obtaining input representing a set of candidate narratives, wherein each candidate narrative is a potential future event sequence;
obtaining input representing domain knowledge, wherein the domain knowledge is associated with at least a portion of the at least one historical dataset of events;
obtaining input representing a query, wherein the query comprises one or more events of interest to a user;
computing attribute scores for one or more first candidate narratives based on at least a portion of the obtained inputs; and
creating one or more second candidate narratives, the one or more second candidate narratives being different from the one or more first candidate narratives; and
wherein one of the attribute scores comprises a plausibility attribute score representing a measure estimating a likelihood that a given candidate narrative will occur in the future;
wherein a second one of the attribute scores comprises a surprise attribute score representing a measure estimating how surprising a given candidate narrative will be to the user;
wherein a third one of the attribute scores comprises an impact attribute score representing a measure estimating how impactful a given candidate narrative will be based on at least a portion of the domain knowledge;
wherein computing attribute scores includes computing attribute scores for the one or more second candidate narratives;
wherein the attribute scores for the one or more first candidate narratives represent a first likelihood of an occurrence of one or more first potential future event sequences;
wherein the attribute scores for the one or more second candidate narratives represent a second likelihood of an occurrence of one or more second potential future event sequences; and
wherein, based at least in part on the respective attribute scores, the second likelihood of an occurrence of the one or more second potential future events sequences is less than the first likelihood of an occurrence of the one or more first potential future events sequences.

2. The system of claim 1, further comprising presenting the computed attribute scores to the user in accordance with an interactive interface.

3. The system of claim 1, further comprising obtaining input representing a profile of the user, wherein user profile comprises a set of events that represent expertise of the user.

4. The system of claim 3, wherein the user profile is used in computing the surprise attribute score.

5. The system of claim 1, wherein the impact attribute score is computed by mapping each event to an event severity value.

6. The system of claim 5, wherein the impact attribute score is further computed by applying an aggregation function to the mapped event severity values.

7. The system of claim 1, further comprising aggregating the attribute scores.

8. The system of claim 7, where aggregating the attribute scores further comprises normalizing the attribute scores and applying a weighted scoring function.

9. The system of claim 7, wherein aggregating the attribute scores further comprises applying a social choice theory process to the attribute scores.

10. The system of claim 7, wherein aggregating the attribute scores comprises generating results including a ranking of the candidate narratives.

11. The system of claim 10, further comprising enabling the user to interactively modify any input to potentially change attribute scores and rankings of candidate narratives.

12. The system of claim 1, wherein the plausibility attribute score for a given candidate narrative is obtained by summing estimated inter-event times between relevant pairs of events.

13. The system of claim 1, wherein the plausibility attribute score for a given candidate narrative is obtained using a superposition of independent Poisson processes.

14. The system of claim 1, wherein the plausibility attribute score for a given candidate narrative is obtained using a continuous time Markov process.

15. The system of claim 1, wherein the surprise attribute score for a given candidate narrative is obtained by computing a Bayesian surprise between prior beliefs associated with the user about events.

16. The system of claim 15, wherein the Bayesian surprise is represented by a probability distribution over the events that represent a prior experience of the user and posterior beliefs after observing the given candidate narrative under consideration.

17. The system of claim 1, wherein the step of obtaining input representing domain knowledge comprises accessing one or more third-party databases, the one or more third-party databases comprising event-related data.

18. A method comprising:
in a system comprising one or more processor devices operatively coupled to one or more memory devices, the one or more processor devices executing steps comprising:
obtaining input representing at least one historical dataset of events;
obtaining input representing a set of candidate narratives, wherein each candidate narrative is a potential future event sequence;
obtaining input representing domain knowledge, wherein the domain knowledge is associated with at least a portion of the at least one historical dataset of events;

obtaining input representing a query, wherein the query comprises one or more events of interest to a user;

computing attribute scores for one or more first candidate narratives based on at least a portion of the obtained inputs; and creating one or more second candidate narratives, the one or more second candidate narratives being different from the one or more first candidate narratives; and wherein one of the attribute scores comprises a plausibility attribute score representing a measure estimating a likelihood that a given candidate narrative will occur in the future;

wherein a second one of the attribute scores comprises a surprise attribute score representing a measure estimating how surprising a given candidate narrative will be to the user;

wherein a third one of the attribute scores comprises an impact attribute score representing a measure estimating how impactful a given candidate narrative will be based on at least a portion of the domain knowledge;

wherein computing attribute scores includes computing attribute scores for the one or more second candidate narratives;

wherein the attribute scores for the one or more first candidate narratives represent a first likelihood of an occurrence of one or more first potential future event sequences;

wherein the attribute scores for the one or more second candidate narratives represent a second likelihood of an occurrence of one or more second potential future event sequences; and wherein, based at least in part on the respective attribute scores, the second likelihood of an occurrence of the one or more second potential future events sequences is less than the first likelihood of an occurrence of the one or more first potential future events sequences.

19. The method of claim 18, further comprising:

obtaining input representing a profile of the user, wherein user profile comprises a set of events that represent expertise of the user; and wherein the user profile is used in computing the surprise attribute score.

20. An article of manufacture comprising a processor-readable storage medium having encoded therein executable code of one or more software programs, wherein the one or more software programs when executed cause one or more processor devices operatively coupled to one or more memory devices to perform steps of:

obtaining input representing at least one historical dataset of events;

obtaining input representing a set of candidate narratives, wherein each candidate narrative is a potential future event sequence;

obtaining input representing domain knowledge, wherein the domain knowledge is associated with at least a portion of the at least one historical dataset of events;

obtaining input representing a query, wherein the query comprises one or more events of interest to a user;

computing attribute scores for one or more first candidate narratives based on at least a portion of the obtained inputs; and creating one or more second candidate narratives, the one or more second candidate narratives being different from the one or more first candidate narratives; and wherein one of the attribute scores comprises a plausibility attribute score representing a measure estimating a likelihood that a given candidate narrative will occur in the future;

wherein a second one of the attribute scores comprises a surprise attribute score representing a measure estimating how surprising a given candidate narrative will be to the user;

wherein a third one of the attribute scores comprises an impact attribute score representing a measure estimating how impactful a given candidate narrative will be based on at least a portion of the domain knowledge;

wherein computing attribute scores includes computing attribute scores for the one or more second candidate narratives;

wherein the attribute scores for the one or more first candidate narratives represent a first likelihood of an occurrence of one or more first potential future event sequences;

wherein the attribute scores for the one or more second candidate narratives represent a second likelihood of an occurrence of one or more second potential future event sequences; and wherein, based at least in part on the respective attribute scores, the second likelihood of an occurrence of the one or more second potential future events sequences is less than the first likelihood of an occurrence of the one or more first potential future events sequences.

* * * * *